(12) United States Patent
Yang (10) Patent No.: US 9,596,501 B2
(45) Date of Patent: Mar. 14, 2017

(54) REMOTE CONTROL PROCESSING METHOD, DEVICE AND SYSTEM

(71) Applicant: ZTE Corporation, Shenzhen (CN)

(72) Inventor: Chao Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/770,716

(22) PCT Filed: Aug. 30, 2013

(86) PCT No.: PCT/CN2013/082649
§ 371 (c)(1),
(2) Date: Aug. 26, 2015

(87) PCT Pub. No.: WO2014/131275
PCT Pub. Date: Sep. 4, 2014

(65) Prior Publication Data
US 2016/0007070 A1    Jan. 7, 2016

(30) Foreign Application Priority Data

Feb. 26, 2013  (CN) .......................... 2013 1 0059737

(51) Int. Cl.
*H04N 7/16* (2011.01)
*H04N 21/4227* (2011.01)
(Continued)

(52) U.S. Cl.
CPC ....... *H04N 21/4227* (2013.01); *H04N 5/4403* (2013.01); *H04N 21/4126* (2013.01);
(Continued)

(58) Field of Classification Search
CPC ......... H04N 21/4126; H04N 21/42207; H04N 21/42204; H04N 21/42219; H04N 21/25
See application file for complete search history.

(56) References Cited

U.S. PATENT DOCUMENTS

| 5,410,326 A * | 4/1995 | Goldstein ............... G08C 23/04 340/12.26 |
| 6,587,873 B1 * | 7/2003 | Nobakht ................. H04L 29/06 348/E5.006 |

(Continued)

FOREIGN PATENT DOCUMENTS

| CN | 101257619 A | 9/2008 |
| CN | 101662656 A | 3/2010 |

(Continued)

OTHER PUBLICATIONS

International Search Report for corresponding application PCT/CN2013/082649 filed Aug. 30, 2013; Mail date Dec. 12, 2013.

(Continued)

*Primary Examiner* — Pankaj Kumar
*Assistant Examiner* — Timothy Newlin
(74) *Attorney, Agent, or Firm* — Cantor Colburn LLP (57) ABSTRACT

Provided are a remote control processing method, device and system. The method comprises: a mobile terminal acquires the address of an STB which is unable to directly communicate with the mobile terminal; and the mobile terminal sends control information for controlling the STB to a push server, wherein the control information comprises the address, the push server forwards the control information to the STB according to the address, and the STB executes control processing according to the forwarded control information, so that the problem that the mobile terminal is unable to control the STB if the mobile terminal fails to directly communicate with the STB in the related arts is solved, and the effect that the mobile terminal can control the STB even the mobile terminal is unable to directly communicate with the STB is achieved.

4 Claims, 10 Drawing Sheets

(51) Int. Cl.
*H04N 5/44* (2011.01)
*H04N 21/414* (2011.01)
*H04N 21/422* (2011.01)
*H04N 21/643* (2011.01)
*H04N 21/41* (2011.01)

(52) U.S. Cl.
CPC ... *H04N 21/41407* (2013.01); *H04N 21/4222* (2013.01); *H04N 21/64322* (2013.01); *H04N 2005/4425* (2013.01); *H04N 2005/4433* (2013.01)

(56) References Cited

U.S. PATENT DOCUMENTS

| | | | | |
|---|---|---|---|---|
| 2004/0119894 A1* | 6/2004 | Higgins | ............ | H04L 12/2805 348/734 |
| 2005/0015812 A1* | 1/2005 | Banet | ............ | H04N 7/17327 725/126 |
| 2008/0225184 A1* | 9/2008 | Hardacker | ............ | H04N 5/4403 348/734 |
| 2008/0281926 A1* | 11/2008 | Walter | ............ | H04N 7/163 709/206 |
| 2009/0172767 A1* | 7/2009 | Li | ............ | H04N 7/163 725/139 |
| 2009/0290072 A1* | 11/2009 | Lee | ............ | G08C 23/04 348/734 |
| 2009/0298535 A1 | 12/2009 | Klein | | |
| 2010/0268955 A1* | 10/2010 | Ohno | ............ | H04L 63/0428 713/171 |
| 2011/0010746 A1* | 1/2011 | Howarter | ............ | H04N 21/4227 725/112 |
| 2011/0273625 A1* | 11/2011 | McMahon | ............ | G06F 21/445 348/734 |
| 2011/0298596 A1* | 12/2011 | Warrick | ............ | G06F 21/305 340/12.53 |
| 2012/0162515 A1* | 6/2012 | Lee | ............ | H04N 21/25816 348/563 |
| 2012/0162537 A1* | 6/2012 | Maddali | ............ | H04N 21/4126 348/734 |
| 2012/0260282 A1* | 10/2012 | Dasher | ............ | H04N 21/4126 725/37 |
| 2012/0272261 A1* | 10/2012 | Reynolds | ............ | H04N 21/222 725/30 |
| 2013/0191757 A1* | 7/2013 | Smith | ............ | G06F 3/0488 715/748 |
| 2013/0225204 A1* | 8/2013 | Mathews | ............ | H04N 21/4126 455/456.3 |
| 2014/0267934 A1* | 9/2014 | Hardin | ............ | H04N 21/654 348/734 |

FOREIGN PATENT DOCUMENTS

| | | |
|---|---|---|
| CN | 102404637 A | 4/2012 |
| CN | 103152624 A | 6/2013 |
| EP | 2386975 A2 | 11/2011 |
| WO | 2007000455 A1 | 1/2007 |
| WO | 2011004024 A1 | 4/2011 |

OTHER PUBLICATIONS

European Search Report for corresponding application EP 13 87 6733; Report Issued Feb. 16, 2016.

\* cited by examiner

REMOTE CONTROL PROCESSING METHOD, DEVICE AND SYSTEM

TECHNICAL FIELD

The disclosure relates to the field of communications, including e.g., a remote control processing method, a remote control processing device and a remote control processing system.

BACKGROUND

With the development of the Internet television, intelligent terminal and software technology, the applications for simulating remote-controller are applied on some mobile terminals occur. Users download these applications and install them to a mobile phone and a tablet computer, then, they can remotely control a Set Top Box (STB) or an intelligent television and carry out multi-screen interaction operations, such as program pushing, channel switching, volume control, display control and text input by the mobile phone and the tablet computer.

In order to enable the function of the simulated remote-controller to be used normally, the mobile terminal and the STB are required to communicate with the Internet. At present, a Local Area Network (LAN) communication scheme is usually adopted, namely, the mobile terminal and the STB or the intelligent TV are located in the same LAN of a home network, and discover and interact with each other through the Universal Plug-and-Play (UPnP) protocol. Whereas, in the traditional IPTV service, to ensure the quality of the service, an operator generally deploys the IPTV network as a private network, and the STB in the private network is unable to communicate with other devices in the home network, that is to say, the remote control function of the mobile terminal is unable to be implemented through the LAN.

Therefore, the problem that the mobile terminal is unable to control the STB if the mobile terminal fails to directly communicate with the STB exists in the related arts.

SUMMARY

The disclosure provides a remote control processing method, a remote control processing device and a remote control processing system, in order to at least solve the problem that a mobile terminal is unable to control an STB if the mobile terminal fails to directly communicate with the STB in the related arts.

According to the first aspect of the embodiment, a remote control processing method is provided, including: acquiring, by a mobile terminal, an address of a Set Top Box (STB) which is unable to directly communicate with the mobile terminal; and sending, by the mobile terminal, to a push server, control information for controlling the STB, wherein the control information comprises the address, the push server forwards the control information to the STB according to the address, and the STB executes control processing according to the forwarded control information.

According to an example embodiment, acquiring, by the mobile terminal, the address of the STB which is unable to directly communicate with the mobile terminal comprises: sending, by the mobile terminal, to a management server, a query request message for acquiring the address of the STB, wherein the management server pre-stores a binding relationship between the mobile terminal and the STB; and receiving, by the mobile terminal, a response message from the management server, wherein the response message carries the address of the STB which has the binding relationship with the mobile terminal.

According to the second aspect of the embodiment, a remote control processing method is provided, comprising: receiving, by a Set Top Box (STB) control information for controlling the STB which is sent from a mobile terminal and forwarded by a push server, wherein the STB is unable to directly communicate with the mobile terminal; and executing, by the STB, control processing according to the control information.

According to an example embodiment, when the control information received by the STB carries a token which is allocated for the STB by a management server, before the STB executes the control processing according to the control information, the method further comprises: by the STB, verifying the token carried in the control information, and executing the control processing according to the control information when the token passes a verification.

According to the third aspect of the embodiment, a remote control processing method is provided, comprising: receiving, by a push server, control information for controlling a Set Top Box (STB) from a mobile terminal, wherein the control information carries an address of the STB; and forwarding, by the push server, the control information to the STB according to the address, wherein the STB executes control processing according to the control information.

According to the fourth aspect of the embodiment, a remote control processing method is provided, comprising: storing, by a management server, a binding relationship between a Set Top Box (STB) and a mobile terminal, wherein the STB is unable to directly communicate with the mobile terminal; receiving, by the management server, a query request message for acquiring an address of the STB from the mobile terminal; and sending, by the management server, a response message to the mobile terminal, wherein the response message carries the address of the STB which has the binding relationship with the mobile terminal, the mobile terminal sends control information for controlling the STB to a push server, the control information carrying the address, the push server forwards the control information according to the address, and the STB executes control processing according to the forwarded control information.

According to an example embodiment, the management server stores the binding relationship between the STB and the mobile terminal, the method further comprises: allocating, by the management server, a token for the STB, wherein the token is used by the STB to authenticate the mobile terminal which sends the control information.

According to the fifth aspect of the embodiment, a remote control processing method is provided, comprising: acquiring, by a mobile terminal, an address of a Set Top Box (STB) which is unable to directly communicate with the mobile terminal; sending, by the mobile terminal, to a push server, control information for controlling the STB, wherein the control information carries the address; forwarding, by the push server, the control information to the STB according to the address; and executing, by the STB, control processing according to the control information.

According to an example embodiment, acquiring, by the mobile terminal, the address of the STB which is unable to directly communicate with the mobile terminal comprises: storing, by a management server, a binding relationship between the mobile terminal and the STB; sending, by the mobile terminal, to the management server, a query request message for acquiring the address of the STB; and sending, by the management server, a response message to the mobile terminal, wherein the response message carries the address of the STB which has the binding relationship with the mobile terminal.

According to the sixth aspect of the embodiment, a remote control processing device is provided, the device is located in a mobile terminal and comprises: an acquiring component, configured to acquire an address of a Set Top Box (STB) which is unable to directly communicate with the mobile terminal; and a first sending component, configured to send to a push server control information for controlling the STB, wherein the control information comprises the address, the push server forwards the control information to the STB according to the address, and the STB executes control processing according to the forwarded control information.

According to an example embodiment, the acquiring component comprises: a sending element, configured to send to a management server a query request message for acquiring the address of the STB, wherein the management server pre-stores a binding relationship between the mobile terminal and the STB; and a receiving element, configured to receive a response message from the management server, wherein the response message carries the address of the STB which has the binding relationship with the mobile terminal.

According to the seventh aspect of the embodiment, a remote control processing device is provided, the device is located in an STB and comprises: a first receiving component, configured to receive control information for controlling the STB which is sent from a mobile terminal and forwarded by a push server, wherein the STB is unable to directly communicate with the mobile terminal; and a processing component, configured to execute control processing according to the control information.

According to an example embodiment, the device further comprises: a verifying component, configured to, when the control information received by the STB carries a token which is allocated for the STB by a management server to the STB, verify the token carried in the control information, and execute the control processing according to the control information when the token passes a verification.

According to the eighth aspect of the embodiment, a remote control processing device is provided, the device is located in a push server and comprises: a second receiving component, configured to receive control information for controlling a Set Top Box (STB) from a mobile terminal, wherein the control information carries an address of the STB; and a forwarding component, configured to forward the control information to the STB according to the address, wherein the STB executes control processing according to the control information.

According to the ninth aspect of the embodiment, a remote control processing device is provided, the device is located in a management server and comprises: a storing component, configured to store a binding relationship between a Set Top Box (STB) and a mobile terminal, wherein the STB is unable to directly communicate with the mobile terminal; a third receiving component, configured to receive a query request message for acquiring the address of the STB from the mobile terminal; and a second sending component, configured to send a response message to the mobile terminal, wherein the response message carries the address of the STB which has the binding relationship with the mobile terminal, the mobile terminal sends control information for controlling the STB to a push server, the control information carrying the address, the push server forwards the control information according to the address, and the STB executes control processing according to the forwarded control information.

According to an example embodiment, the device further comprises: an allocating component, configured to allocate a token for the STB, wherein the token is used by the STB to authenticate the mobile terminal which sends the control information.

According to the tenth aspect of the embodiment, a remote control processing system is provided, comprising: a mobile terminal, configured to acquire an address of a Set Top Box (STB) which is unable to directly communicate with the mobile terminal, wherein the mobile terminal is further configured to send to a push server, control information for controlling the STB, and the control information carries the address; the push server, configured to forward the control information to the STB according to the address; and the STB, configured to execute control processing according to the control information.

According to an example embodiment, the system further comprises: a management server, configured to store a binding relationship between the mobile terminal and the STB, wherein the mobile terminal is further configured to send to the management server, a query request message for acquiring the address of the STB; and the management server is further configured to send a response message to the mobile terminal, and the response message carries the address of the STB which has the binding relationship with the mobile terminal.

Through the disclosure, the mobile terminal acquires the address of the STB which is unable to directly communicate with the mobile terminal; and the mobile terminal sends control information for controlling the STB to the push server, wherein the control information includes the address, the push server forwards the control information to the STB according to the address, and the STB executes control processing according to the forwarded control information, so that the problem that the mobile terminal is unable to control the STB when the mobile terminal fails to directly communicate with the STB in the related arts is solved, and the effect that the mobile terminal can control the STB even the mobile terminal is unable to directly communicate with the STB is achieved.

BRIEF DESCRIPTION OF THE DRAWINGS

The drawings illustrated here are to provide further understanding of the disclosure and constitute one part of the application, and the exemplary embodiments of the disclosure and the explanations thereof are intended to explain the disclosure, instead of improperly limiting the disclosure. In the drawings.

DETAILED DESCRIPTION OF THE EMBODIMENTS

The disclosure will be described below in combination with the drawings and embodiments in detail. It should be noted that, in case of no conflict, the embodiments of the application and features therein can be combined with one another.

Figure 1:
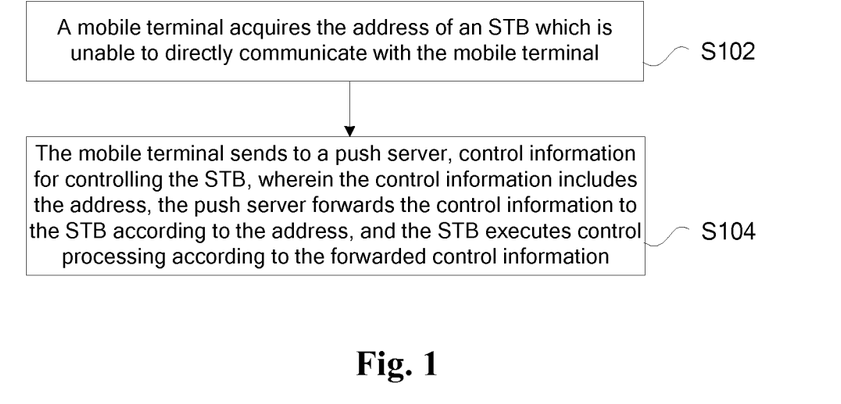
FIG. 1 is a first flowchart of a remote control processing method according to an embodiment of the disclosure.

A remote control processing method is provided in the embodiment of the disclosure. FIG. 1 is a first flowchart of a remote control processing method according to an embodiment of the disclosure. As shown in FIG. 1, the flow includes the following steps:

Step 102: A mobile terminal acquires the address of an STB which is unable to directly communicate with the mobile terminal.

Step 104: The mobile terminal sends control information for controlling the STB to a push server, wherein the control information includes the address, the push server forwards the control information to the STB according to the address, and the STB executes control processing according to the forwarded control information.

With respect to the related art in which the mobile terminal and the STB are located in different networks so that the mobile terminal is unable to control the STB, by the step that the mobile terminal forwards the control information for controlling the STB through the push server, the mobile terminal can control the STB and execute a multi-screen interactive service even the mobile terminal is unable to directly communicate with the STB, thus improving the user experience.

The mobile terminal may acquire the address of the STB which is unable to directly communicate with the mobile terminal in various ways. For example, the mobile terminal may acquire the address of the STB from a management server: firstly, the mobile terminal sends a query request message for acquiring the address of the STB to the management server, wherein the management server pre-stores a binding relationship between the mobile terminal and the STB, and it should be noted that the binding relationship stored in the management server may be the binding relationship between the mobile terminal and the STB set by the management server after the STB and the mobile terminal log into the management server and pass the authentication of the management server respectively or in other moments or time when the mobile terminal interacts with the management server. The mobile terminal receives a response message from the management server, wherein the response message carries the address of the STB which has the binding relationship with the mobile terminal. Of course, the mobile terminal can also acquire the address of the STB in other ways, which will not be detailed here.

Figure 2:
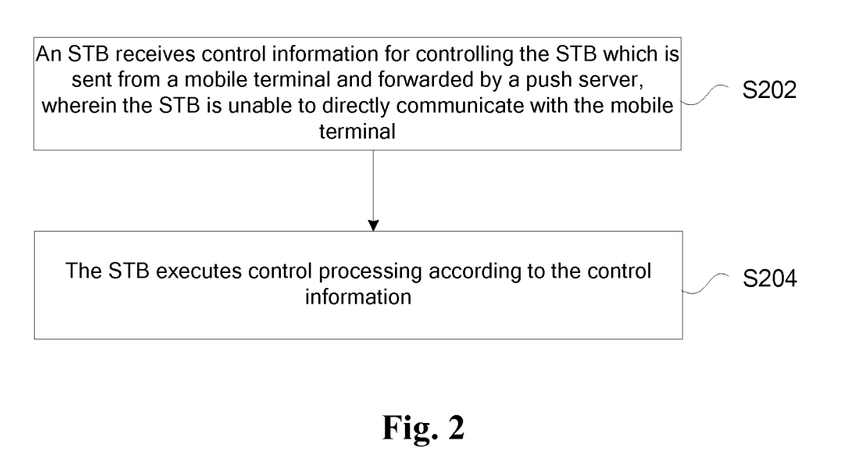
FIG. 2 is a second flowchart of a remote control processing method according to an embodiment of the disclosure.

A remote control processing method is provided in the embodiment of the disclosure. FIG. 2 is a second flowchart of a remote control processing method according to an embodiment of the disclosure. As shown in FIG. 2, the flow includes the following steps:

Step 202: An STB receives control information for controlling the STB which is sent from a mobile terminal and forwarded by a push server, wherein the STB is unable to directly communicate with the mobile terminal.

Step 204: The STB executes control processing according to the control information.

With respect to the related arts in which the STB is unable to be controlled by the mobile terminal when the mobile terminal and the STB is unable to communicate directly, by the step that the STB can acquire the control information for controlling the STB from the mobile terminal in directly, wherein the control information is forwarded by the push server, the problems in the related arts are solved, and the user experience is improved.

In an example embodiment, when the control information received by the STB carries a token which is allocated for the STB by the management server, before the STB executes the control processing according to the control information, the method further includes: the STB verifies the token carried in the control information (i.e., judging whether the token carried by the mobile terminal is the same as the token allocated for the STB by the management server) and executes control processing according to the control information when the token passes the verification. By the processing, the STB can authenticate the mobile terminal which controls the STB so that the security of controlling the STB by the mobile terminal is enhanced.

Figure 3:
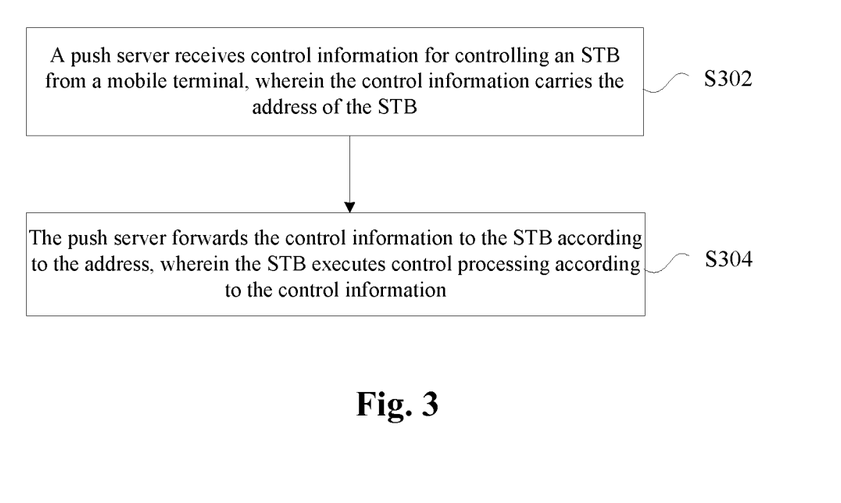
FIG. 3 is a third flowchart of a remote control processing method according to an embodiment of the disclosure.

A remote control processing method is further provided in the embodiment of the disclosure. FIG. 3 is a third flowchart of a remote control processing method according to an embodiment of the disclosure. As shown in FIG. 3, the flow includes the following steps:

Step 302: A push server receives control information for controlling an STB from a mobile terminal, wherein the control information carries the address of the STB.

Step 304: The push server forwards the control information to the STB according to the address, wherein the STB executes control processing according to the control information.

By the step that the push server forwards the control information for controlling the STB from the mobile terminal, the problem that the mobile terminal is unable to control the STB if the mobile terminal and the STB is unable to directly communicate in the related arts is solved, so that the mobile terminal can control the STB even the mobile terminal and the STB is unable to directly communicate.

Figure 4:
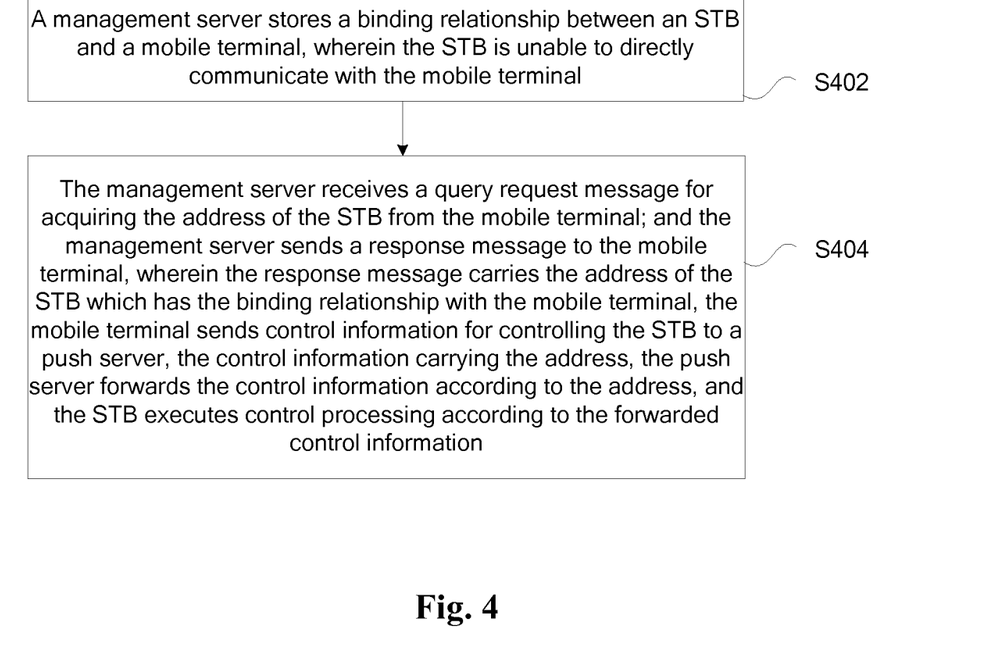
FIG. 4 is a fourth flowchart of a remote control processing method according to an embodiment of the disclosure.

A remote control processing method is further provided in the embodiment of the disclosure. FIG. 4 is a fourth flowchart of a remote control processing method according to an embodiment of the disclosure. As shown in FIG. 4, the flow includes the following steps:

Step 402: A management server stores a binding relationship between an STB and a mobile terminal, wherein the STB is unable to directly communicate with the mobile terminal.

Step 404: The management server receives a query request message for acquiring the address of the STB from the mobile terminal; and the management server sends a response message to the mobile terminal, wherein the response message carries the address of the STB which has the binding relationship with the mobile terminal, the mobile terminal sends control information for controlling the STB to a push server, the control information carrying the address, the push server forwards the control information according to the address, and the STB executes control processing according to the forwarded control information.

In an optional manner, after the management server stores the binding relationship between the STB and the mobile terminal, the method further includes: the management server allocates a token for the STB, wherein the token is used by the STB to authenticate the mobile terminal which sends the control information.

Figure 5:
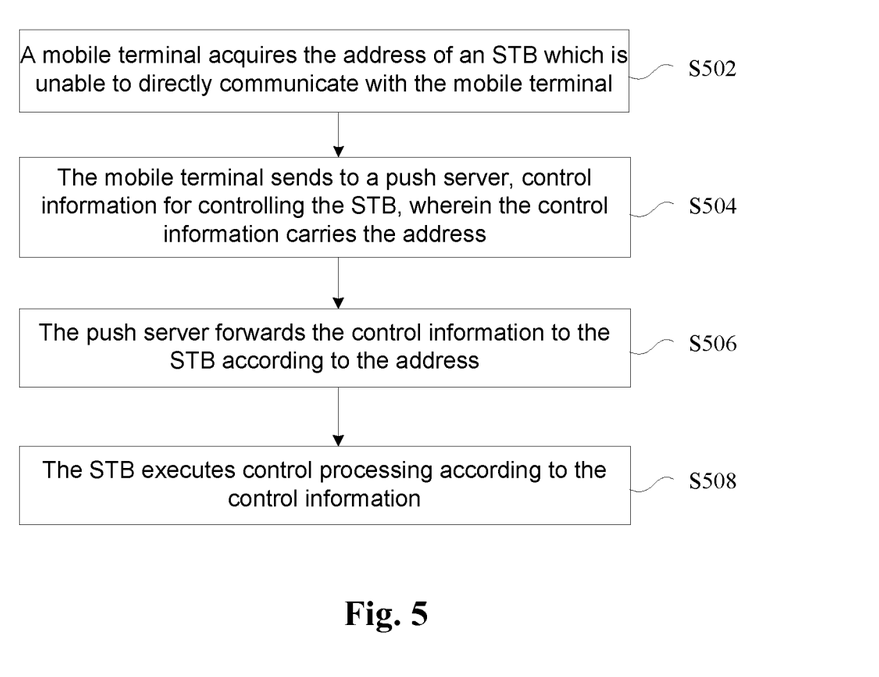
FIG. 5 is a fifth flowchart of a remote control processing method according to an embodiment of the disclosure.

A remote control processing method is provided in the embodiment of the disclosure. FIG. 5 is a fifth flowchart of a remote control processing method according to an embodiment of the disclosure. As shown in FIG. 5, the flow includes the following steps:

Step 502: A mobile terminal acquires the address of an STB which is unable to directly communicate with the mobile terminal.

Step 504: The mobile terminal sends control information for controlling the STB to a push server, wherein the control information carries the address.

Step 506: The push server forwards the control information to the STB according to the address.

Step 508: The STB executes control processing according to the control information.

In an optional manner, the step that a mobile terminal acquires the address of an STB which is unable to directly communicate with the mobile terminal includes: a management server stores a binding relationship between the mobile terminal and the STB; the mobile terminal sends a query request message for acquiring the address of the STB to the management server; and the management server sends a response message to the mobile terminal, wherein the response message carries the address of the STB which has the binding relationship with the mobile terminal.

In one embodiment of the disclosure, a remote control processing device and system are further provided, which are configured to implement the embodiments and the example embodiments above, thereby needing no further description. As below, the term "component" can implement the combination of software and/or hardware of predetermined functions. Although the device and the system described in the following embodiments are preferably implemented by software, the implementation of hardware or the combination of the software and hardware can also be composed.

Figure 6:
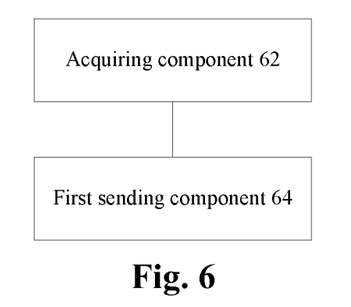
FIG. 6 is a first block diagram showing the structure of a remote control processing device according to an embodiment of the disclosure.

FIG. 6 is a first block diagram showing the structure of a remote control processing device according to an embodiment of the disclosure. As shown in FIG. 6, the device is located in a mobile terminal and includes: an acquiring component 62 and a first sending component 64, and the device is described below.

The acquiring component 62 is configured to acquire the address of an STB which is unable to directly communicate with the mobile terminal; and the first sending component 64 is connected with the acquiring component 62 and is configured to send control information for controlling the STB to a push server, wherein the control information includes the address, the push server forwards the control information to the STB according to the address, and the STB executes control processing according to the forwarded control information.

Figure 7:
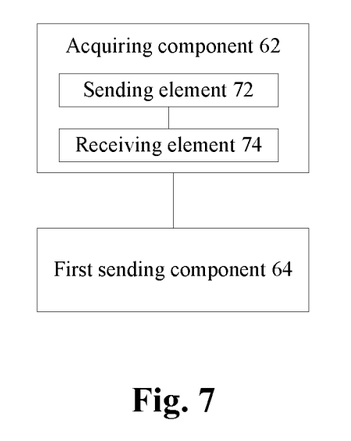
FIG. 7 is a block diagram showing the example structure of an acquiring component 62 in a remote control processing device according to an embodiment of the disclosure.

FIG. 7 is a block diagram showing the example structure of an acquiring component 62 in a remote control processing device according to an embodiment of the disclosure. As shown in FIG. 7, the acquiring component 62 includes a sending element 72 and a receiving element 74, and the acquiring component 62 is described below.

The sending element 72 is configured to send a query request message for acquiring the address of the STB to a management server, wherein the management server prestores a binding relationship between the mobile terminal and the STB; and the receiving element 74 is connected with the sending element 72 and is configured to receive a response message from the management server, wherein the response message carries the address of the STB which has the binding relationship with the mobile terminal.

Figure 8:
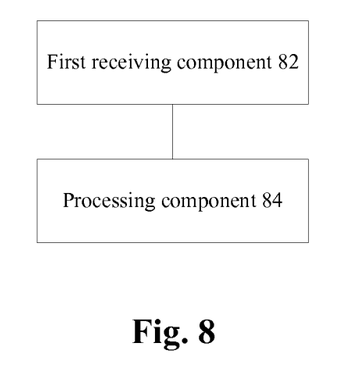
FIG. 8 is a second block diagram showing the structure of a remote control processing device according to an embodiment of the disclosure.

FIG. 8 is a second block diagram showing the structure of a remote control processing device according to an embodiment of the disclosure. As shown in FIG. 8, the remote control processing device is located in an STB and includes: a first receiving component 82 and a processing component 84, and the device is described below.

The first receiving component 82 is configured to receive control information for controlling the STB which is sent from a mobile terminal and forwarded by a push server, wherein the STB is unable to directly communicate with the mobile terminal; and the processing component 84 is connected with the first receiving component 82 and is configured to execute control processing according to the control information.

Figure 9:
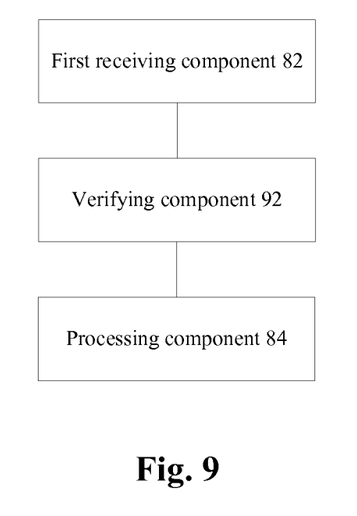
FIG. 9 is a block diagram showing the example structure of a remote control processing device according to an embodiment of the disclosure.

FIG. 9 is a block diagram showing the example structure of a remote control processing device according to an embodiment of the disclosure. As shown in FIG. 9, besides all the components in FIG. 8, the device further includes a verifying component 92, and the verifying component 92 is described below.

The verifying component 92 is connected with the first receiving component 82 and the processing component 84 and is configured to, when the control information received by the STB carries a token which is allocated for the STB by a management server to the STB, verify the token carried in the control information, and execute the control processing according to the control information when the token passes the verification.

Figure 10:
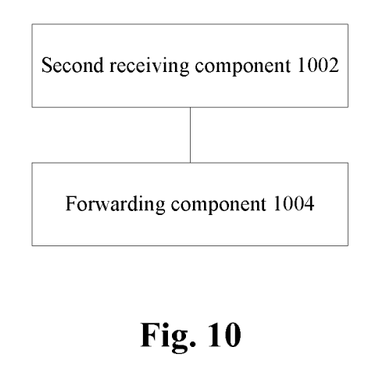
FIG. 10 is a third block diagram showing the structure of a remote control processing device according to an embodiment of the disclosure.

FIG. 10 is a third block diagram showing the structure of a remote control processing device according to an embodiment of the disclosure. As shown in FIG. 10, the device is located in a push server and includes: a second receiving component 1002 and a forwarding component 1004, and the device is described below.

The second receiving component 1002 is configured to receive control information for controlling an STB from a mobile terminal, wherein the control information carries the address of the STB; and the forwarding component 1004 is connected with the second receiving component 1002 and is configured to forward the control information to the STB according to the address, wherein the STB executes the control processing according to the control information.

Figure 11:
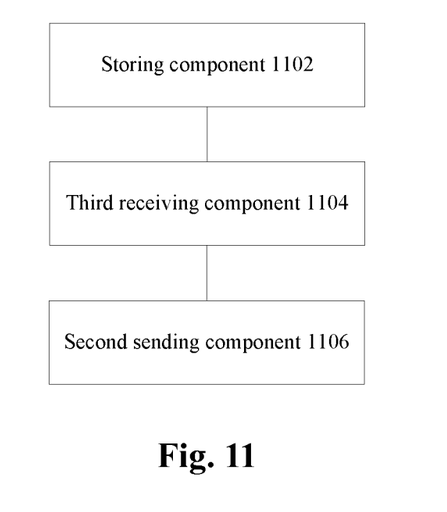
FIG. 11 is a fourth block diagram showing the structure of a remote control processing device according to an embodiment of the disclosure.

FIG. 11 is a fourth block diagram showing the structure of a remote control processing device according to an embodiment of the disclosure. As shown in FIG. 11, the remote control processing device is located in a management server and includes: a storing component 1102, a third receiving component 1104 and a second sending component 1106, and the device is described below.

The storing component 1102 is configured to store a binding relationship between an STB and a mobile terminal, wherein the STB is unable to directly communicate with the mobile terminal; the third receiving component 1104 is configured to receive a query request message for acquiring the address of the STB from the mobile terminal; and the second sending component 1106 is connected with the storing component 1102 and the third receiving component 1104 and is configured to send a response message to the mobile terminal, wherein the response message carries the address of the STB which has the binding relationship with the mobile terminal, the mobile terminal sends control information for controlling the STB to a push server, the control information carrying the address, the push server forwards the control information according to the address, and the STB executes control processing according to the forwarded control information.

Figure 12:
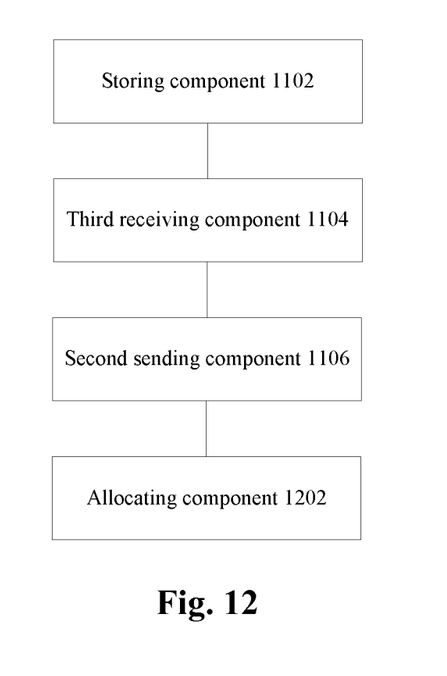
FIG. 12 is a block diagram showing the example structure of a remote control processing device according to an embodiment of the disclosure.

FIG. 12 is a block diagram showing the example structure of a remote control processing device according to an embodiment of the disclosure. As shown in FIG. 12, besides all the components in FIG. 11, the device further includes an allocating component 1202 which is connected to the second sending component 1106 and is configured to allocate a token for the STB, wherein the token is used by the STB to authenticate the mobile terminal which sends the control information.

Figure 13:
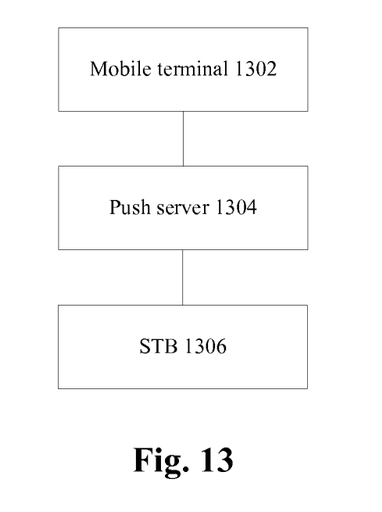
FIG. 13 is a diagram showing the structure of a remote control processing system according to an embodiment of the disclosure.

FIG. 13 is a diagram showing the structure of a remote control processing system according to an embodiment of the disclosure. As shown in FIG. 13, the system includes a mobile terminal 1302, a push server 1304 and an STB 1306, and the structure is described below.

The mobile terminal 1302 is configured to acquire the address of the STB which is unable to directly communicate with the mobile terminal and is further configured to send to the push server 1304 control information for controlling the STB, wherein the control information carries the address; the push server 1304 is connected with the mobile terminal 1302 and the STB 1306 and is configured to forward the control information to the STB according to the address; and the STB 1306 is configured to execute control processing according to the control information.

Figure 14:
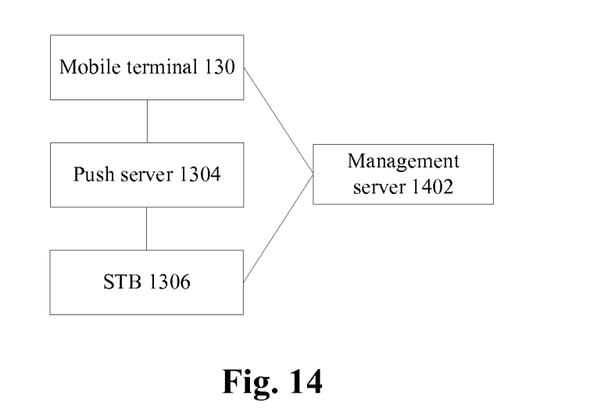
FIG. 14 is a diagram showing the example structure of a remote control processing system according to an embodiment of the disclosure.

FIG. 14 is a diagram showing the example structure of a remote control processing system according to an embodiment of the disclosure. As shown in FIG. 14, besides all the components in FIG. 13, the system further includes: a management server 1402, which is connected with the mobile terminal 1302 and the STB 1306 and is configured to store the binding relationship between the mobile terminal and the STB, wherein the mobile terminal 1302 is further configured to send to the management server, a query request message for acquiring the address of the STB; and the management server 1402 is further configured to send a response message to the mobile terminal, wherein the response message carries the address of the STB which has the binding relationship with the mobile terminal.

The example embodiments of the disclosure are explained below with reference to the drawings.

A method for remotely controlling an STB by a mobile terminal is provided in the embodiment of the disclosure, so that the mobile terminal can remotely control the STB even the mobile terminal is unable to directly communicate with the STB, and multi-screen interaction operation is implemented. The method for remotely controlling the STB by the mobile terminal includes the following steps:

Step 1: The mobile terminal acquires the address of the STB in a private network.

Step 2: The mobile terminal sends a control message (i.e., the control information above) to a push server, wherein the message carries the address of the STB in the private network.

Step 3: The push server parses the control message and forwards the control message to the address of the STB specified in the control message.

Step 4: The STB receives the control message and executes the following control operations.

In an optional manner, the following processing ways can be adopted in Step 1:

Step 11: The STB logs into a management server after being started, wherein the login message contains the account, password and the address in the private network of the STB; and the account and address information of the STB are recorded after the STB passes the authentication of the management server.

Step 12: Before sending the control message to the STB, the mobile terminal acquires the address of the STB from the management server, wherein the request message contains the account and password of the mobile terminal, and the accounts of the mobile terminal and the STB in the same home network are bound in advance. After the mobile terminal passes the authentication of the management server, the account of the bound STB which has logged into the management server is inquired according to the account of the mobile terminal, and the address of the STB corresponding to the account of the STB is returned.

Furthermore, after the STB passes the authentication of the management server, a token can be allocated to the STB and returned to the STB in an authentication response and further returned to the mobile terminal when the mobile terminal queries the address of the STB; the mobile terminal carries the token when sending the control message to the push server; and the STB, after receiving the control message, authenticates the token at first, if the token in the control message is consistent with that in a login response of the STB, the token passes the verification and the operation is executed, otherwise, the control message is regarded as illegal and no operation is executed.

The token is re-allocated every time when the STB logs in and is updated regularly in the online period of the STB.

After executing the operation, the STB returns an operation result to the push server, and the push server forwards the operation result to the mobile terminal.

Figure 15:
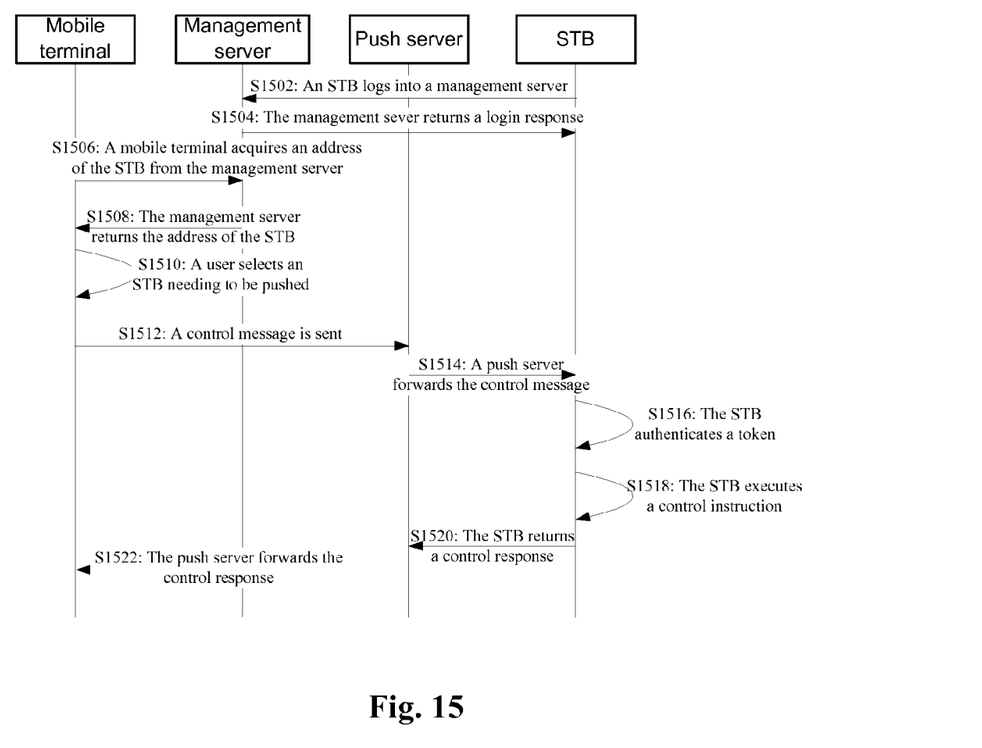
FIG. 15 is a flowchart of a method for remotely controlling an STB by a mobile terminal according to an example embodiment of the disclosure.

FIG. 15 is a flowchart of a method for remotely controlling an STB by a mobile terminal according to an example embodiment of the disclosure. As shown in FIG. 15, the flow includes the following steps that:

Step 1502: The STB, after being started, logs into a management server, wherein a login request message includes the account and password of the STB.

Step 1504: The management server, after receiving the login request message from the STB, analyzes the address of the STB from the login request message and then records the account and address of the STB. The management server allocates a token for this login and returns the token to the STB through a login response.

Step 1506: The mobile terminal sends a query request message for the address of the STB to the management server, wherein the query request message includes the account and password of the mobile terminal, and the accounts of the mobile terminal and the STB in the same home network are bound in advance.

Step 1508: After the mobile terminal passes the authentication of the management server, the account of the bound STB which has logged in is inquired according to the account of the mobile terminal, and the address of the STB and the token corresponding to the account of the STB are returned.

Step 1510: A user carries out remote control operation, and can select one STB for remote control if the management server returns the information of a plurality of STBs.

Step 1512: The mobile terminal sends a control message to a push server, wherein the control message carries the address of the STB, the token and a control instruction.

Step 1514: The control message is forwarded to the address of the STB specified in the control message.

Step 1516: The STB, after receiving the control message, verifies the token in the control message, if the token is consistent with that in a login response, the token is regarded to pass the authentication; otherwise, the token does not pass the verification.

Step 1518: If the token passes the authentication, the control instruction is executed.

Step 1520: The STB returns an execution result of the control instruction to the push server.

Step 1522: The push server forwards the execution result of the control instruction to the mobile terminal.

Figure 16:
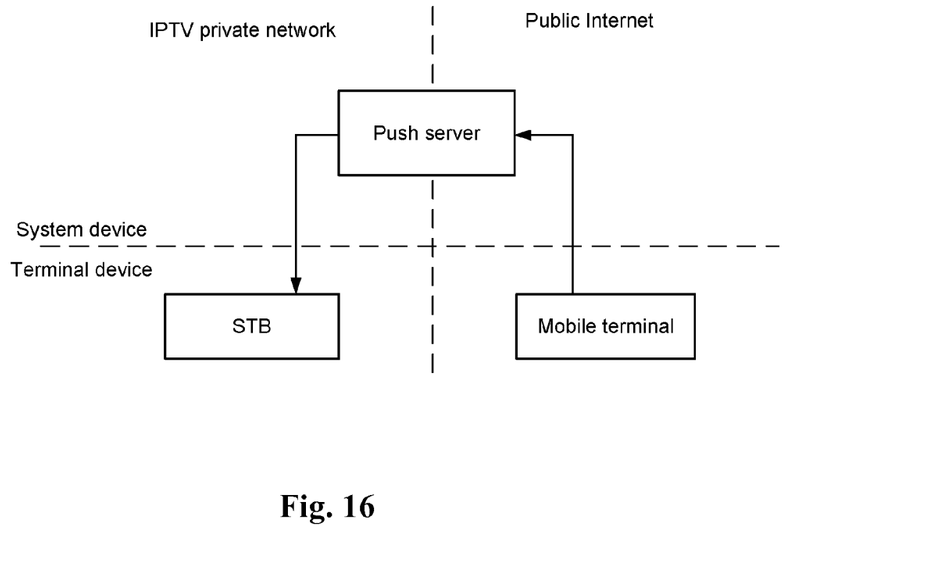
FIG. 16 is a diagram showing the structure of a system for remotely controlling an STB by a mobile terminal according to an example embodiment of the disclosure.

A system for remotely controlling an STB by a mobile terminal is provided in the embodiment of the disclosure. FIG. 16 is a diagram showing the structure of a system for remotely controlling an STB by a mobile terminal according to an example embodiment of the disclosure. As shown in FIG. 16, the system for remotely controlling the STB by the mobile terminal includes: the mobile terminal, the STB and a push server, and the system is described below.

The mobile terminal is located in a home network or a public Internet, and is configured to acquire the address of the STB, and send a control message to the push server, wherein the control message carries the address of a target STB and a control instruction (or control information).

The push server is bridged between the public Internet and an IPTV private network, and can carry out network communication with the mobile terminal and the STB at the same time; and the push server receives the control message from the mobile terminal and forwards the control message to the address of the STB specified in the control message.

The STB, which is located in the IPTV private network and is unable to be directly visited by the mobile terminal, receives the control message forwarded by the push server and executes control operation.

Figure 17:
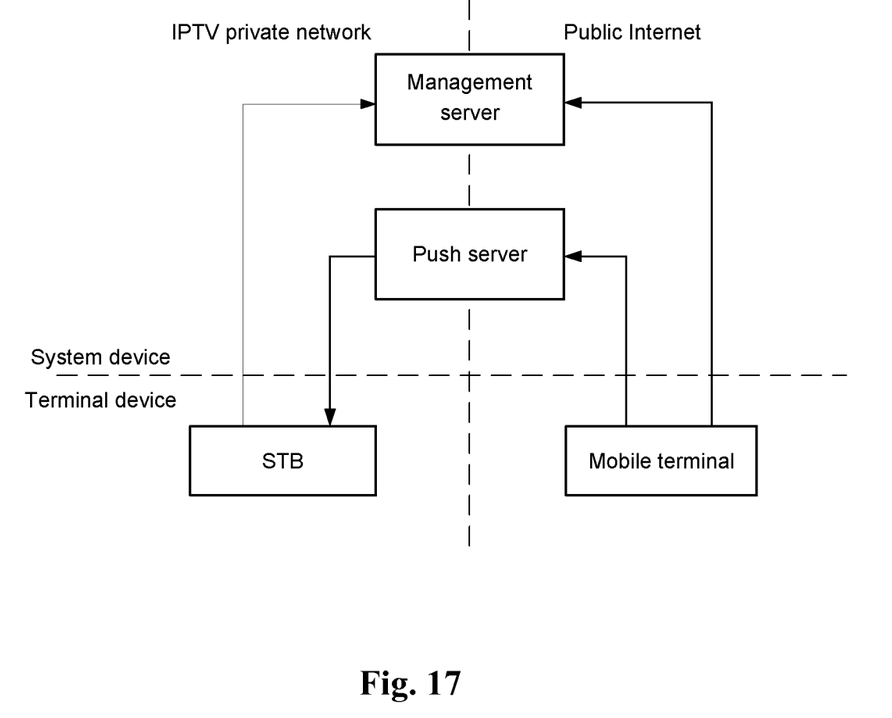
FIG. 17 is a diagram showing the optional structure of a system for remotely controlling an STB by a mobile terminal according to an example embodiment of the disclosure.

FIG. 17 is a diagram showing the optional structure of a system for remotely controlling an STB by a mobile terminal according to an example embodiment of the disclosure. As shown in FIG. 17, besides the mobile terminal, the STB and the push server in FIG. 16, the system for remotely controlling the STB by the mobile terminal further includes: a management server, which is bridged between a public Internet and an IPTV private network and can carry out network communication with the mobile terminal and the STB at the same time.

The management server is further configured to maintain the binding relationship between the accounts of the mobile terminal and the STB; and the management server is further configured to authenticate a login request of the STB and record the address of the STB;

and the management server is further configured to authenticate a query request from the mobile terminal and return the address of the logged STB bound with the account of the mobile terminal. If the account of the mobile terminal is bound with a plurality of logged STBs, the addresses of the STBs are returned in a list form.

In an optional manner, after the STB passes the authentication, the management server can further allocate a token to the STB, return the token to the STB in an authentication response, and further return the token to the mobile terminal when the mobile terminal queries the address of the STB; the mobile terminal carries the token when sending the control message to the push server; and the STB, after receiving the control message, authenticates the token at first, if the token passes the authentication, the operation is executed, otherwise, the control message is regarded as illegal and no operation is executed. After completing the control operation, the STB can return an operation result to the push server, and the push server forwards the operation result to the mobile terminal.

Figure 18:
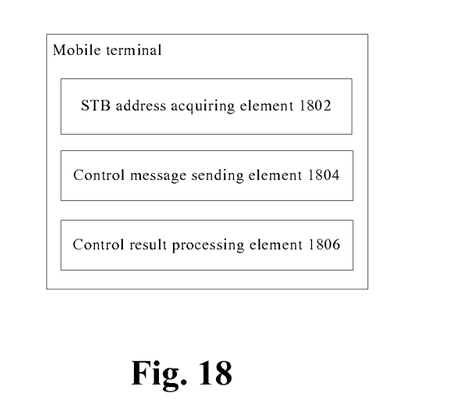
FIG. 18 is a diagram showing the structure of a mobile terminal according to an example embodiment of the disclosure.

A mobile terminal is further provided in the example embodiment of the disclosure. FIG. 18 is a diagram showing the structure of a mobile terminal according to an example embodiment of the disclosure. As shown in FIG. 18, the mobile terminal includes: an STB address acquiring element 1802 (same as the acquiring component 62 in function) and a control message sending element 1804 (same as the first sending component 64 in function). The mobile terminal is described below.

The STB address acquiring element 1802 is configured to send a query request to a management server, wherein the query request carries the account and password of the mobile terminal, and a query result contains the address of the STB which is bound with the account of the mobile terminal in a private network. Preferably, the query result can further include a token allocated by a management platform.

The control message sending element 1804 is configured to send a control message to a push server, wherein the control message carries the address of the STB in the private network and a control instruction. Preferably, the control message can further include the token allocated by the management platform.

Preferably, the mobile terminal can further include: a control result processing element 1806, which is configured to process a control result returned by the push server.

Figure 19:
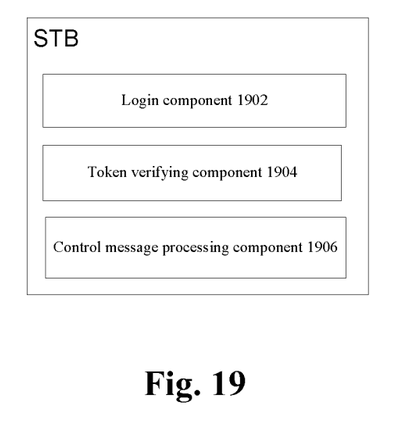
FIG. 19 is a diagram showing the structure of an STB according to an example embodiment of the disclosure.

An STB is further provided in the example embodiment of the disclosure. FIG. 19 is a diagram showing the structure of an STB according to an example embodiment of the disclosure. As shown in FIG. 19, the STB includes a control message processing component 1906 (same as the processing component 84 in function), and the STB is described below.

The control message processing component 1906 is configured to receive a control message forwarded by a push server and execute a control command. Preferably, the control message processing component is further configured to return an execution result to the push server after completing the execution of the control command.

In an optional manner, the STB can further include: a login component 1902 which is configured to log into a management server, wherein a login message carries the account and password of the STB and the address of the STB in a private network.

In an optional manner, the STB can further include: a token verifying component 1904 (same as the verifying component 92 in function), which is configured to, after receiving the control message forwarded by the push server, verify a token in the control message; if the token is the same as that in a login response, the token is regarded to pass the verification and control operation is executed; otherwise, no operation is executed.

Figure 20:
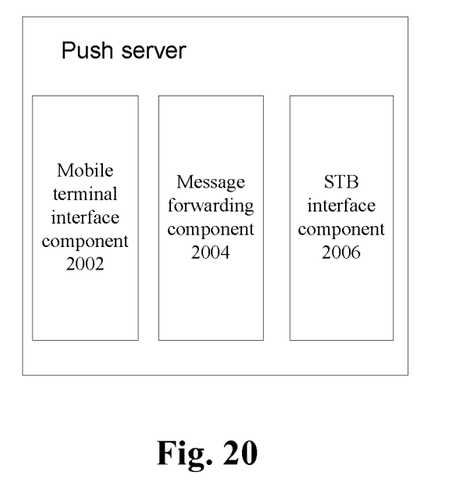
FIG. 20 is a block diagram showing the structure of a push server according to an example embodiment of the disclosure.

A push server is further provided in an example embodiment of the disclosure. FIG. 20 is a block diagram showing the structure of a push server according to an example embodiment of the disclosure. As shown in FIG. 20, the push server includes: a mobile terminal interface component 2002 (same as the second receiving component 1002 in function), a message forwarding component 2004 and an STB interface component 2006 (both same as the forwarding component 1004 in function), and the push server is described below.

The mobile terminal interface component 2002 is configured to receive a control message from a mobile terminal in a public Internet.

The message forwarding component 2004 is configured to parse the control message from the mobile terminal, extract the address of the STB from the control message, then re-organize a message and send the re-organized message to the STB interface component 2006.

The STB interface component 2006 is configured to send a message to a specified STB address.

Figure 21:
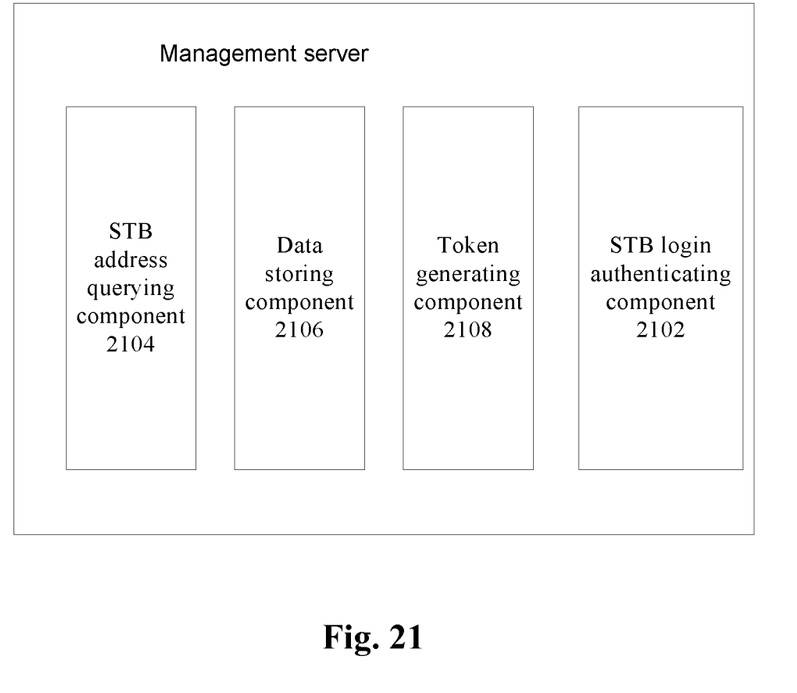
FIG. 21 is a diagram showing the structure of a management server according to an example embodiment of the disclosure.

A management server is further provided in an example embodiment of the disclosure. FIG. 21 is a diagram showing the structure of a management server according to an example embodiment of the disclosure. As shown in FIG. 21, the management server includes: an STB login authenticating component 2102, an STB address querying component 2104 (same as the third receiving component 1104 in function) and a data storing component 2106 (same as the storing component 1102 in function), and the management server is described below.

The STB login authenticating component 2102 is configured to receive an STB login request from an IPTV private network, and authenticate the account and password of the STB to verify the legality of the STB. If the STB passes the verification, the account and address of the STB are extracted to be saved in the data storing component 2106.

The STB address querying component 2104 is configured to receive an STB address query request from a mobile terminal in a public Internet, and after the account and password of the mobile terminal pass the verification, query an address corresponding to the account of the bound STB from the data storing component 2106 according to the account of the mobile terminal, wherein there may be a plurality of query results.

The data storing component 2106 is configured to store the corresponding relationship between the accounts of the mobile terminal and the STB, and save the address of the STB after the STB logs in successfully.

Preferably, the management server further includes: a token generating component 2108 (same as the allocating component 1202 in function), which is configured to generate a token for each STB login request, wherein the token corresponds to the account of the STB one by one and is saved in the data storing component 2106. The STB login authenticating component 2102 returns the token to the STB in a login response, and the STB address querying component 2104 returns the token to the mobile terminal in a query response.

According to the method, the devices and the system for remotely controlling the STB by the mobile terminal provided by the embodiments and the example embodiments, the mobile terminal sends a remote control instruction to the STB in the IPTV private network through the push server which is bridged in a public Internet and the IPTV private network, so that the remote control function and a multi-screen interactive service of the mobile terminal can be implemented without modifying the home network of an IPTV user even the mobile terminal and the STB is unable to communicate directly in an LAN (or they are not in the same network).

Obviously, those skilled in the art shall understand that the modules or steps of the disclosure may be implemented by general computing device and centralized in a single computing device or distributed in a network consisting of multiple computing device. Optionally, the modules or steps may be implemented by program codes executable by the computing device, so that they may be stored in a storage device and executed by the computing device, and, in some cases, the steps can be executed in a sequence different from the illustrated or described sequence, or they are respectively made into the integrated circuit modules or many of them are made into a single integrated circuit module. By doing so, the disclosure is not limited to any specific combination of hardware and software.

The above are only the preferred embodiments of the disclosure and not intended to limit the disclosure. For those skilled in the art, various modifications and changes can be made in the disclosure. Any modifications, equivalent replacements, improvements and the like within the spirit and principle of the disclosure shall fall within the scope of protection of the disclosure.

What is claimed is:

1. A remote control processing method, comprising:
   acquiring, by a mobile terminal, an address of a Set Top Box (STB) which is unable to directly communicate with the mobile terminal; and
   sending, by the mobile terminal, to a push server, control information for controlling the STB, wherein the control information comprises the address, the push server forwards the control information to the STB according to the address, and the STB executes control processing according to the forwarded control information;
   wherein when the mobile terminal is unable to directly communication with the STB through the address of the STB, acquiring, by the mobile terminal, the address of the STB comprises:
      sending, by the mobile terminal, to a management server, a query request message for acquiring the address of the STB, wherein the management server pre-stores a binding relationship between the mobile terminal and the STB; and
      receiving, by the mobile terminal, a response message from the management server, wherein the response message carries the address of the STB which has the binding relationship with the mobile terminal,
   wherein when the control information received by the STB carries a token which is allocated for the STB by the management server, before the STB executes the control processing according to the control information, the method further comprises:
  determining, by the STB, whether the token carried in the control information is the same as the token allocated for the STB by the management server; and
  executing control processing according to the control information when the token carried in the control information is the same as the token allocated for the STB by the management server.

2. A remote control processing method, comprising:
receiving, by a push server, control information for controlling a Set Top Box (STB) from a mobile terminal, wherein the control information carries an address of the STB; and
forwarding, by the push server, the control information to the STB according to the address, wherein the STB executes control processing according to the control information;
wherein the address of the STB is acquired from a management server by the following steps:
  sending, by the mobile terminal, a query request message for acquiring the address of the STB to the management server, which pre-stores a binding relationship between the mobile terminal and the STB; and
  receiving, by the mobile terminal, a response message from the management server, wherein the response message carries the address of the STB which has the binding relationship with the mobile terminal,
  wherein when the control information received by the STB carries a token which is allocated for the STB by the management server, before the STB executes the control processing according to the control information, the method further comprises:
    determining, by the STB, whether the token carried in the control information is the same as the token allocated for the STB by the management server; and
    executing, by the STB, control processing according to the control information when the token carried in the control information is the same as the token allocated for the STB by the management server.

3. A remote control processing device located in a mobile terminal, comprises a hardware processor, coupled with a non-transitory computer readable storage storing computer executable instructions, wherein the computer executable instructions comprise:
  an acquiring component to acquire an address of a Set Top Box (STB) when the mobile terminal is unable to directly communicate with the STB; and
  a first sending component to send to a push server control information for controlling the STB, wherein the control information comprises the address, the push server forwards the control information to the STB according to the address, and the STB executes control processing according to the forwarded control information;
  wherein the acquiring component comprises:
    a sending element to send to a management server a query request message for acquiring the address of the STB, wherein the management server pre-stores a binding relationship between the mobile terminal and the STB; and
    a receiving element to receive a response message from the management server, wherein the response message carries the address of the STB which has the binding relationship with the mobile terminal,
    wherein the control information sent by the mobile terminal further carries a token which is allocated for the STB by the management server, which is used for being compared, by the STB, with the token allocated for the STB by the management server to make the STB execute control processing according to the control information when the token carried in the control information is the same as the token allocated for the STB by the management server.

4. A remote control processing device located in a push server, comprises a hardware processor, coupled with a non-transitory computer readable storage storing computer executable instructions, wherein the computer executable instructions comprise:
  a second receiving component to receive control information for controlling a Set Top Box (STB) from a mobile terminal, wherein the control information carries an address of the STB; and
  a forwarding component to forward the control information to the STB according to the address, wherein the STB executes control processing according to the control information;
  wherein the address of the STB is acquired from a management server by the following steps:
  sending, by the mobile terminal, a query request message for acquiring the address of the STB to the management server, which pre-stores a binding relationship between the mobile terminal and the STB; and
  receiving, by the mobile terminal, a response message from the management server, wherein the response message carries the address of the STB which has the binding relationship with the mobile terminal,
  wherein the control information sent by the mobile terminal further carries a token which is allocated for the STB by the management server, which is used for being compared, by the STB, with the token allocated for the STB by the management server to make the STB execute control processing according to the control information when the token carried in the control information is the same as the token allocated for the STB by the management server.

\* \* \* \* \*